(12) United States Patent
Pan et al.

(10) Patent No.: US 12,358,163 B2
(45) Date of Patent: Jul. 15, 2025

(54) SUCTION NOZZLE DEVICE

(71) Applicant: FANUC CORPORATION, Yamanashi (JP)

(72) Inventors: Chao Pan, Yamanashi (JP); Yoshio Motowaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 315 days.

(21) Appl. No.: 18/031,546

(22) PCT Filed: Nov. 2, 2021

(86) PCT No.: PCT/JP2021/040369
§ 371 (c)(1),
(2) Date: Apr. 12, 2023

(87) PCT Pub. No.: WO2022/097632
PCT Pub. Date: May 12, 2022

(65) Prior Publication Data
US 2023/0405838 A1 Dec. 21, 2023

(30) Foreign Application Priority Data
Nov. 9, 2020 (JP) .............................. 2020-186706

(51) Int. Cl.
*B25J 15/06* (2006.01)
(52) U.S. Cl.
CPC ........... *B25J 15/06* (2013.01); *B25J 15/0616* (2013.01)

(58) Field of Classification Search
CPC .............................. B25J 15/06; B25J 15/0616
See application file for complete search history.

(56) References Cited

U.S. PATENT DOCUMENTS

| | | | | |
|---|---|---|---|---|
| 4,728,135 A | * | 3/1988 | Sugimura | ............ B25J 15/0616 294/186 |
| 4,762,354 A | * | 8/1988 | Gfeller | ................ H01L 21/6838 294/183 |

(Continued)

FOREIGN PATENT DOCUMENTS

| | | |
|---|---|---|
| JP | 2002-192492 A | 7/2002 |
| JP | 2008-264973 A | 11/2008 |
| JP | 2017-113870 A | 6/2017 |

OTHER PUBLICATIONS

International Search Report issued in PCT/JP2021/040369 mailed on Jan. 25, 2022 with English Translation (5 pages).

(Continued)

*Primary Examiner* — Seahee Hong
(74) *Attorney, Agent, or Firm* — Nakanishi IP Associates, LLC (57) ABSTRACT

A suction nozzle device includes a large-diameter pipe, a large-diameter nozzle, a small-diameter pipe, a small-diameter nozzle, and a support mechanism for supporting the large-diameter and small-diameter pipes so as to be movable relative to each other. As the large-diameter and the small-diameter pipes move relative to each other, the large-diameter nozzle and the small-diameter nozzle selectively protrude. A nozzle can be selected from nozzles having different diameters, and the flow rate can be varied in accordance with the selection of the nozzle.

7 Claims, 7 Drawing Sheets

(56) References Cited

U.S. PATENT DOCUMENTS

| | | | | |
|---|---|---|---|---|
| 5,113,578 A | * | 5/1992 | Jackson | H05K 13/0409 |
| | | | | 29/743 |
| 5,542,726 A | * | 8/1996 | Ozawa | B25J 15/0616 |
| | | | | 29/743 |
| 2020/0086505 A1 | * | 3/2020 | Nie | B25J 15/0616 |

OTHER PUBLICATIONS

Written Opinion of the International Searching Authority issued in PCT/JP2021/040369 mailed on Jan. 25, 2022 with English Translation (6 pages).

* cited by examiner

ID NOZZLE DEVICE

SUCTION NOZZLE DEVICE

TECHNICAL FIELD

One aspect of the present invention relates to a suction nozzle device for vacuum-sucking a workpiece.

BACKGROUND ART

In order to vacuum-suck a workpiece suitably, it is necessary to appropriately replace the suction nozzle with a suction nozzle having a diameter corresponding to the size of the workpiece. Conventionally, there has been a configuration in which a plurality of suction nozzles having different diameters are attached to a rotary disk, and the suction nozzles can be switched by rotating the rotary disk.

In this configuration, however, a plurality of suction nozzles need to be provided around the rotary disk, which increases the overall size of the device and sometimes makes it difficult to insert a nozzle into a narrow space to suck a workpiece. In addition, since a rotary disk and its rotation mechanism are required, it has been difficult to move the device at a high speed due to an increase in weight and an accompanying increase in inertia.

A structure for causing one of the nozzles having different diameters to protrude (see Patent Literature 1) has also been proposed; however, in this structure, the flow path cross-sectional area is fixed to the inner diameter cross-sectional area of the nozzle having the smallest diameter, making it difficult to optimize the flow rate in accordance with the weight of the workpiece.

CITATION LIST

Patent Literature

Patent Literature 1; Japanese Unexamined Patent Application Publication No. 2002-192492

DETAILED DESCRIPTION

A suction nozzle device for vacuum-sucking a workpiece includes a large-diameter pipe, a large-diameter nozzle attached to a tip of the large-diameter pipe, a small-diameter pipe coaxially inserted into the large-diameter pipe and having an outer diameter shorter than an inner diameter of the large-diameter pipe in order to provide a gap between the small-diameter pipe and the large-diameter pipe, a small-diameter nozzle attached to a tip of the small-diameter pipe, and a support mechanism for supporting the large-diameter pipe and the small-diameter pipe so as to be movable relative to each other. As the large-diameter pipe and the small-diameter pipe move relative to each other, the suction nozzle device changes between a state where the small-diameter nozzle protrudes from the large-diameter nozzle and a state where the small-diameter nozzle is drawn into the large-diameter nozzle, and changes between a state where a flow path cross-sectional area of a flow path through which gas flows is set to an inner cross-sectional area of the small-diameter pipe by an outer peripheral surface of the small-diameter nozzle being brought into close contact with a rear inner edge of the large-diameter nozzle so as to close a gap between the large-diameter pipe and the small-diameter pipe, a state where the flow path cross-sectional area is set to an inner diameter cross-sectional area of the large-diameter nozzle by the outer peripheral surface of the small-diameter nozzle being separated from the rear inner edge of the large-diameter nozzle so as to open the gap between the large-diameter pipe and the small-diameter pipe, and a state where the flow path cross-sectional area is set to a value within an area range less than the inner diameter cross-sectional area of the large-diameter nozzle but greater than the inner diameter cross-sectional area of the small-diameter nozzle by the outer peripheral surface of the small-diameter nozzle approaching the rear inner edge of the large-diameter nozzle.

Hereinafter, a suction nozzle device for vacuum-sucking a workpiece according to the present embodiment will be described with reference to the drawings. In the following description, constituent elements having substantially the same function and configuration are denoted by the same reference numeral, and repetitive descriptions will be given only where necessary.

Figure 1:
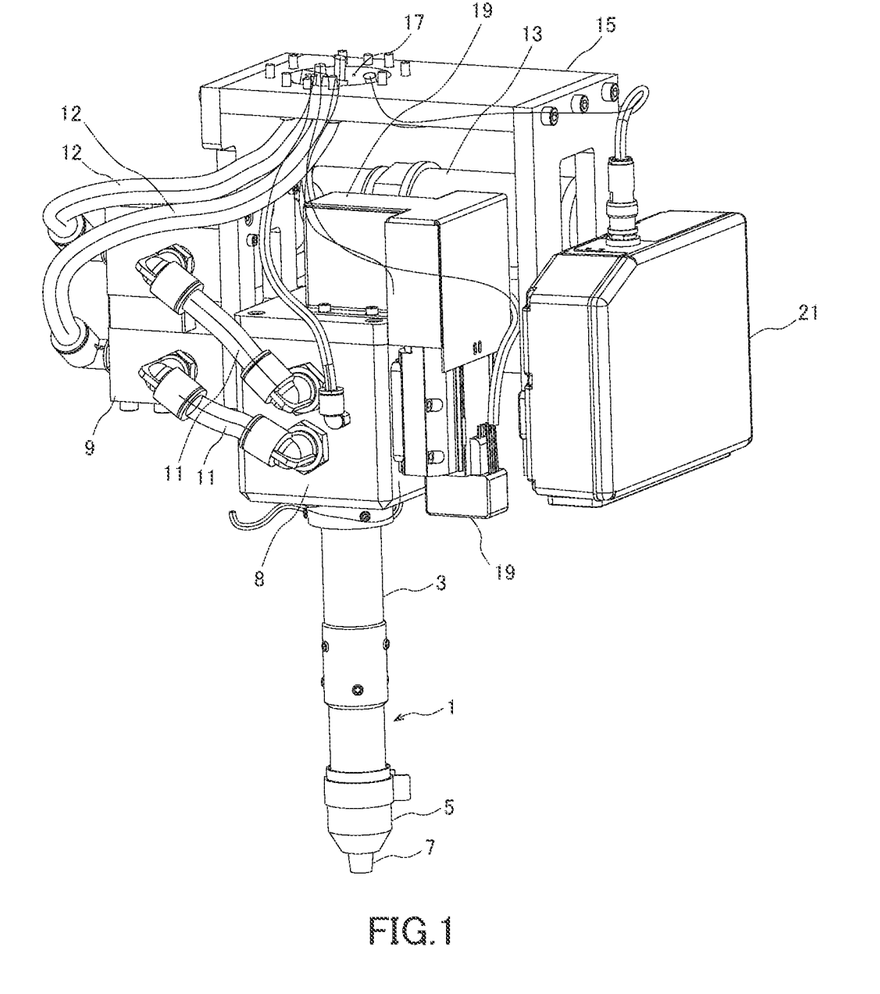
FIG. 1 is a perspective view of an entire end effector equipped with a suction nozzle device according to an embodiment.

As shown in FIG. 1, a suction nozzle device 1 according to the present embodiment is incorporated into a vacuum suction end effector (also simply referred to as a hand) that is attached to the tip of a robot arm. The suction nozzle device 1 has a long circular pipe (hereinafter referred to as a large-diameter pipe) 3. A nozzle (referred to as a large-diameter nozzle) 5 is attached to the tip of the large-diameter pipe 3. A long circular pipe (small-diameter pipe) having a diameter smaller than that of the large-diameter pipe 3, which will be described later, is coaxially inserted into the large-diameter pipe 3. A small-diameter nozzle 7 is attached to the tip of the small-diameter pipe. The large-diameter nozzle 5 and the small-diameter nozzle 7 are each molded of an air-impermeable and elastic resin material, typically urethane or synthetic rubber.

The outer diameter of the small-diameter pipe is shorter than the inner diameter of the large-diameter pipe 3, and a gap is provided between the large-diameter pipe 3 and the small-diameter pipe. As will be described in detail later, the small-diameter pipe is provided so as to be movable along the central axis relative to the large-diameter pipe 3, and the small-diameter nozzle 7 is drawn into the large-diameter pipe 3 as the small-diameter pipe 3 moves, changing between a state in which the large-diameter nozzle 5 protrudes from the small-diameter nozzle 7 and a state in which the small-diameter nozzle 7 protrudes from the large-diameter nozzle 5.

In the state where the large-diameter nozzle 5 protrudes from the small-diameter nozzle 7, the small-diameter nozzle 7 is separated from the large-diameter nozzle 5, and the gap space between the large-diameter pipe 3 and the small-diameter pipe is opened, thereby securing the inner diameter cross-sectional area of the large-diameter nozzle 5 as the flow path cross-sectional area which is the main variable for determining the flow rate of gas (air). On the other hand, in the state where the small-diameter nozzle 7 protrudes from the large-diameter nozzle 5, the small-diameter nozzle 7 is brought into close contact with the large-diameter nozzle 5 to close the gap space between the large-diameter pipe 3 and the small-diameter pipe, thereby reducing the flow path cross-sectional area to the inner diameter cross-sectional area of the small-diameter nozzle 7. Further, in the state where the small-diameter nozzle 7 approaches the large-diameter nozzle 5, the flow path cross-sectional area changes continuously between the inner diameter cross-sectional area of the large-diameter nozzle 5 and the inner diameter cross-sectional area of the small-diameter nozzle 7 in accordance with the distance between the large-diameter nozzle 5 and the small-diameter nozzle 7.

As described above, in the present embodiment, as the small-diameter pipe moves relative to the large-diameter pipe 3, the large-diameter nozzle 5 or the small-diameter nozzle 7 can be selected, and the flow path cross-sectional area can be changed continuously between the inner diameter cross-sectional area of the large-diameter nozzle 5 and the inner diameter cross-sectional area of the small-diameter nozzle 7. Details will be described below.

A connection block 8 is connected to the rear end of the large-diameter pipe 3. The connection block 8 has a hollow structure, and an airtight chamber (sealed chamber) is formed therein. A vacuum ejector 9 is connected to the connection block 8 via a vacuum hose 11. A joint of the vacuum ejector 9 is connected via a vacuum hose 12 to a joint 17 opened in a hand base 15. The joint 17 is connected to an external vacuum pump via a vacuum hose. Compressed air supplied from the external vacuum pump generates vacuum pressure inside the vacuum ejector 9, and is exhausted from an exhaust duct through a silencer 13. Due to the vacuum pressure generated inside the vacuum ejector 9, the air in the airtight chamber inside the connection block 8 and the air in the large-diameter pipe 3 are sucked in. As a result, the airtight chamber inside the connection block 8 and the inside of the large-diameter pipe 3 are formed into a vacuum state lower than the atmospheric pressure, and the workpiece is sucked onto the large-diameter nozzle 5 or the small-diameter nozzle 7.

An electric actuator 19 is attached to the suction nozzle device 1 to move the small-diameter pipe relative to the large-diameter pipe 3. A sensor box 21 is attached to the hand base 15, for example, to detect the apex of workpieces piled up in bulk as they are.

Figure 2:
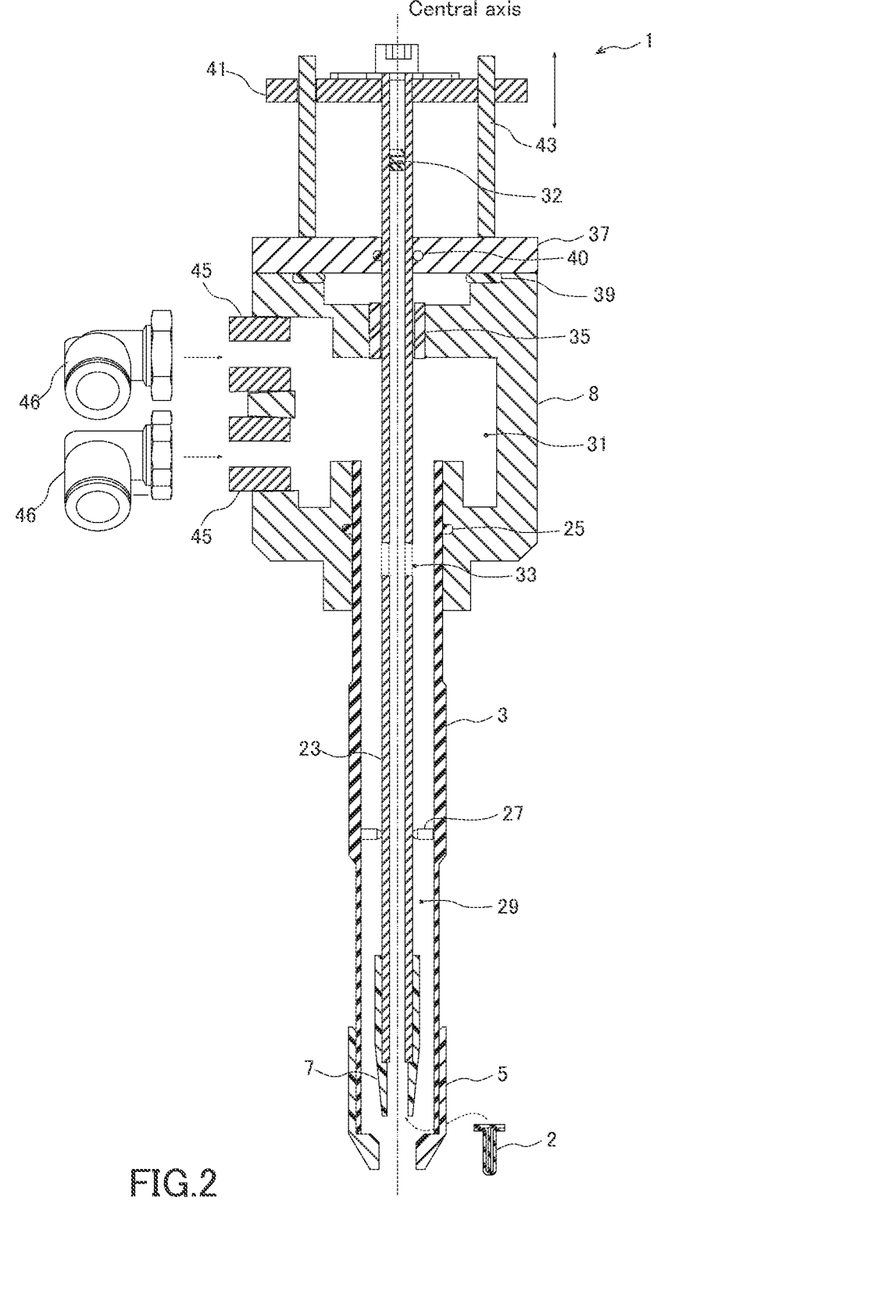
FIG. 2 is a longitudinal cross-sectional view of the suction nozzle device shown in FIG. 1.

As shown in FIG. 2, the connection block 8 is connected to the rear end of the large-diameter pipe 3, and is sealed with an O-ring 25. A small-diameter pipe 23 is inserted into the large-diameter pipe 3, and the small-diameter pipe 23 is positioned by a ball plunger 27 to be coaxial with the large-diameter pipe 3. The outer diameter of the small-diameter pipe 23 is shorter than the inner diameter of the large-diameter pipe 3, and a gap space 29 is formed between the large-diameter pipe 3 and the small-diameter pipe. The gap space 29 communicates with the airtight chamber 31 inside the connection block 8 through a rear end opening of the large-diameter pipe 3. The inner space of the small-diameter pipe 23 communicates with the gap space 29 between the large-diameter pipe 3 and the small-diameter pipe through a communication hole 33 formed in the middle of the small-diameter pipe 23, and further communicates with the airtight chamber 31 through the gap space 29. A sealing member 32 is fitted in the small-diameter pipe 23. The inner space of the small-diameter pipe 23 is set to a vacuum state together with the airtight chamber 31 and the gap space 29.

The small-diameter pipe 23 is supported at its rear portion by a linear bush attached to the rear end opening of the connection block 8 so as to be movable back and forth along the central axis. The linear bush 35, together with the ball plunger 27, constitutes a support mechanism that supports the large-diameter pipe 3 and the small-diameter pipe 23 so as to be movable relative to each other. A back plate 37 is attached to the rear end of the connection block 8 with an O-ring 39 interposed therebetween. The small-diameter pipe 23 is inserted into a through hole formed in the back plate 37 with an O-ring 40 interposed therebetween. The O-ring allows the small-diameter pipe 23 to move back and forth while maintaining the airtight state of the airtight chamber 31 inside the connection block 8.

The rear end of the small-diameter pipe 23 protrudes from the hole passing through the back plate 37, and is fixed to a movable plate 41. The movable plate 41 is supported by a linear guide 43 so as to be movable back and forth along the central axis, and is connected to an operating portion of the electric actuator 19. When the movable plate 41 is moved back and forth by the electric actuator 19, the small-diameter pipe 23 moves relative to the large-diameter pipe 3 accordingly. Although a structure in which the small-diameter pipe 23 moves relative to the large-diameter pipe 3 has been described as an example, the large-diameter pipe 3 may move relative to the small-diameter pipe 23, or both the large-diameter pipe 3 and the small-diameter pipe 23 may move to realize their relative movement.

A side wall of the connection block 8 is opened, and a connection portion 45 is fitted in the opening. The vacuum hose 11 is connected to the connection portion 45 via a fitting 46. Thus, the inside of the connection block 8 communicates with the inside of the vacuum ejector 9.

Figure 3:
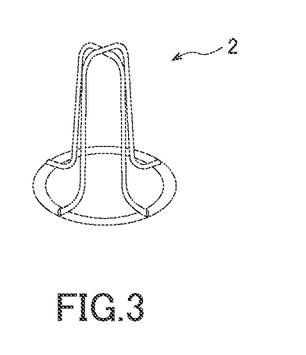
FIG. 3 is a perspective view of a workpiece entry prevention bracket shown in FIG. 2.

At the tip of the small-diameter pipe 23 and inside the small-diameter nozzle 7, there is attached an entry prevention bracket 2 for preventing very small workpieces from entering the small-diameter nozzle 7 and the small-diameter pipe 23 without inhibiting the flow of gas (air). As shown in FIG. 3, for example, a plurality of U-shaped wires 6 are provided at intervals around an annular base 4 as the entry prevention bracket 2.

Figure 4:
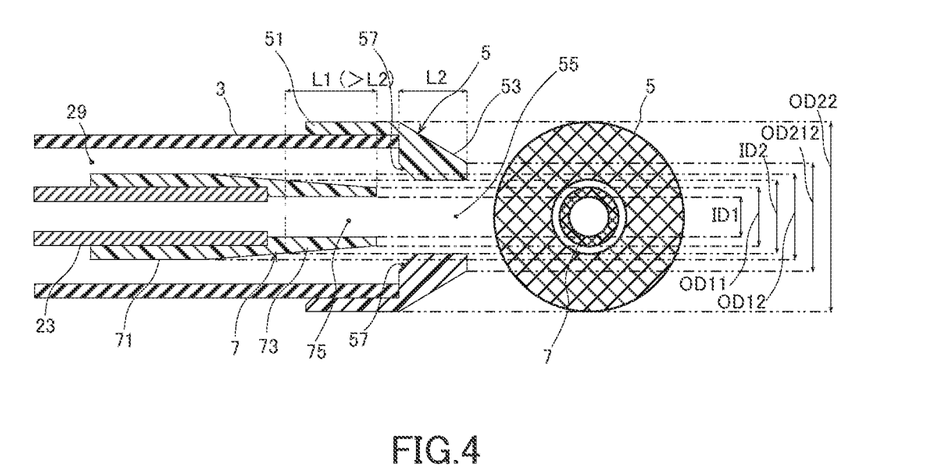
FIG. 4 is an enlarged view of a nozzle tip portion shown in FIG. 2.

As shown in FIG. 4, a rear portion 51 of the large-diameter nozzle 5 is fitted to the tip of the large-diameter pipe 3. A tip portion 53 of the large-diameter nozzle 5 has a tapered truncated cone shape, and a cylindrical hole 55 extends through the tip portion 53 from its front to rear. The tip portion 53 of the large-diameter nozzle 5 is a main portion as a nozzle. Hereinafter, when the tip portion 53 and the rear portion 51 are referred to simply as the large-diameter nozzle 5 without distinction, the large-diameter nozzle 5 refers to the tip portion 53. Here, the structure for fitting the rear portion 51 of the large-diameter nozzle 5 to the tip of the large-diameter pipe 3 has been described as an example of the structure for joining the large-diameter nozzle 5 to the tip of the large-diameter pipe 3, but the structure is not limited thereto, and any structure can be adopted, such as directly joining the rear end surface of the tip portion 53 of the large-diameter nozzle 5 to the tip surface of the large-diameter pipe 3.

A rear portion 71 of the small-diameter nozzle 7 is fitted to the tip of the small-diameter pipe 23. A tip portion 73 of the small-diameter nozzle 7 also has a tapered truncated cone shape, and a cylindrical hole 75 extends through the tip portion 73 from its front to rear. The tip portion 73 of the small-diameter nozzle 7 is a main portion as a nozzle. Hereinafter, when the tip portion 73 and the rear portion 71 are referred to simply as the small-diameter nozzle 7 without distinction, the small-diameter nozzle 7 refers to the tip portion 73. Similarly, the structure for joining the small-diameter nozzle 7 to the tip of the small-diameter pipe 23 is not limited to the structure for fitting the rear portion 71 of the small-diameter nozzle 7 to the tip of the small-diameter pipe 23, and any structure can be adopted, such as directly joining the rear end surface of the tip portion 73 of the small-diameter nozzle 7 to the tip surface of the small-diameter pipe 23.

The diameter (inner diameter) ID1 of the small-diameter nozzle 7 is shorter than the diameter (inner diameter) ID2 of the large-diameter nozzle 5. The outer diameter OD12 of the rear end of the truncated conical tip portion 73 of the small-diameter nozzle 7 is longer than the inner diameter ID2 of the large-diameter nozzle and both are circular; therefore, the outer peripheral surface of the tip portion 73 of the small-diameter nozzle 7 can be brought into contact with the rear inner edge 57 of the tip portion 53 of the large-diameter nozzle 5. In addition, the large-diameter nozzle 5 and the small-diameter nozzle 7 are molded of an air-impermeable and elastic resin material; therefore, the outer peripheral surface of the tip portion 73 of the small-diameter nozzle 7 can be brought into close contact with the rear inner edge 57 of the tip portion 53 of the large-diameter nozzle 5, and the gap space 29 between the large-diameter pipe 3 and the small-diameter pipe 23 can be closed.

When the outer peripheral surface of the tip portion 73 of the small-diameter nozzle 7 is brought into close contact with the rear inner edge 57 of the tip portion 53 of the large-diameter nozzle 5, that is, when the outer diameter of the tip portion 73 of the small-diameter nozzle 7 matches the inner diameter ID2 of the large-diameter nozzle 5, the partial length L1 of the small-diameter nozzle 7 from that position to the tip is longer than the length L2 of the tip portion 53 of the large-diameter nozzle Thus, when the small-diameter nozzle 7 moves forward to the limit of the movable range where the outer peripheral surface of the tip portion 73 of the small-diameter nozzle 7 is brought into close contact with the rear inner edge 57 of the tip portion 53 of the large-diameter nozzle 5, the tip of the small-diameter nozzle 7 can protrude from the large-diameter nozzle 5.

Figure 5A:
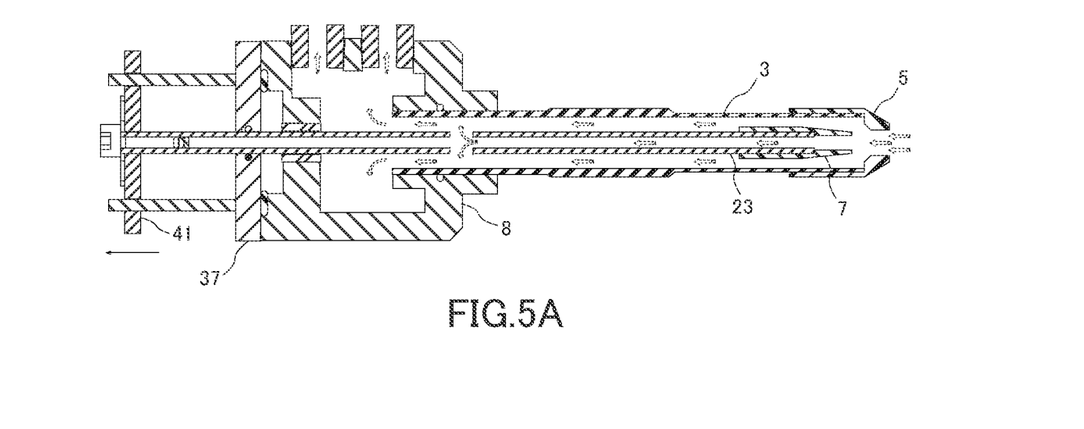
FIG. 5A is a longitudinal cross-sectional view showing a first state of the suction nozzle device shown in FIG. 1.
Figure 5B:
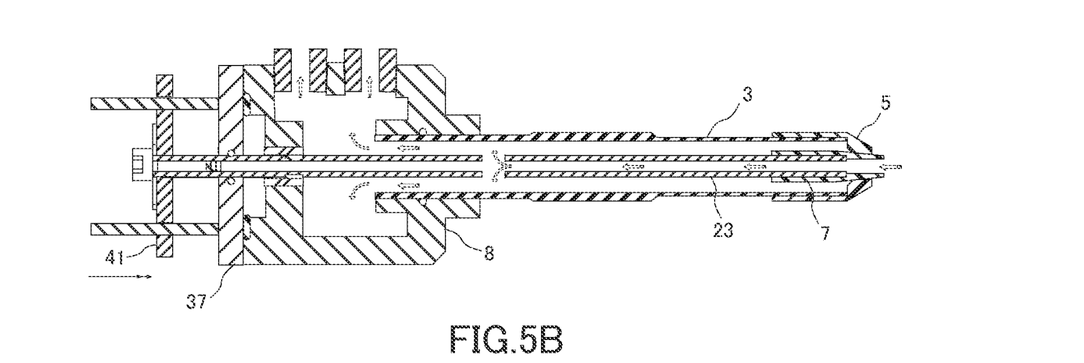
FIG. 5B is a longitudinal cross-sectional view showing a second state of the suction nozzle device shown in FIG. 1.
Figure 5C:
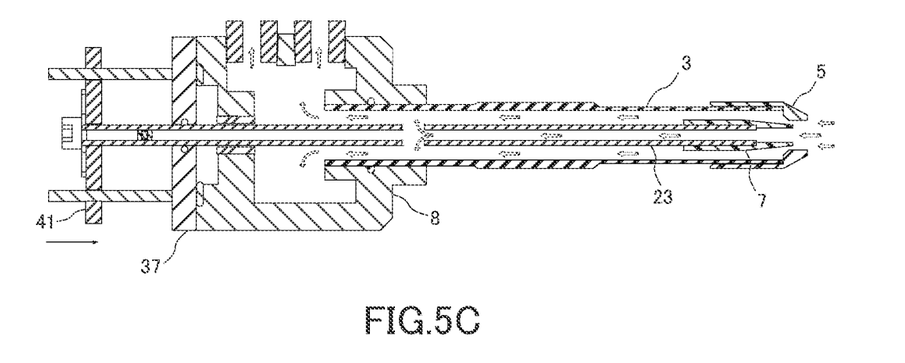
FIG. 5C is a longitudinal cross-sectional view showing a third state of the suction nozzle device shown in FIG. 1.
Figure 6A:
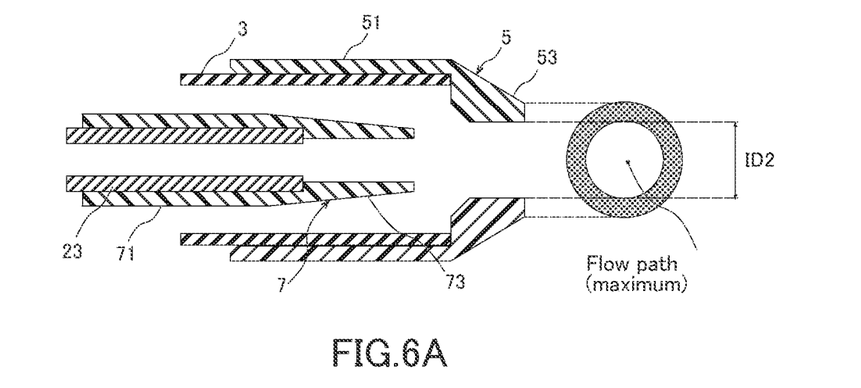
FIG. 6A is a longitudinal cross-sectional view showing the flow path cross-sectional area corresponding to the first state shown in FIG. 5A.

FIG. 5A shows a state where the large-diameter nozzle 5 protrudes from the small-diameter nozzle 7 (large-diameter state), FIG. 5B shows a state where the small-diameter nozzle 7 protrudes from the large-diameter nozzle 5 (small-diameter state), and FIG. 5C shows a state where the tip portion of the small-diameter nozzle 7 partially overlaps the large-diameter nozzle 5 (medium-diameter state). FIG. 6A shows a partial enlarged view of FIG. 5A, FIG. 6B shows a partial enlarged view of FIG. 5B, and FIG. 6C shows a partial enlarged view of FIG. 5C.

As shown in FIGS. 5A and 6A, the large-diameter nozzle 5 can be made to protrude from the small-diameter nozzle 7 by pulling back the small-diameter pipe 23 to near the limit of the movable range. Since the outer diameter OD2 of the large-diameter nozzle 5 is larger than the outer diameter OD1 of the small-diameter nozzle 7, the large-diameter nozzle 5 is suitable for sucking a relatively large workpiece. At this time, the tip portion 73 of the small-diameter nozzle 7 is separated from the rear inner edge 57 of the tip portion 53 of the large-diameter nozzle 5 by the maximum distance, and the gap space 29 between the large-diameter pipe 3 and the small-diameter pipe 23 is opened; therefore, the flow path diameter of the suction nozzle device 1 is equivalent to the inner diameter of the large-diameter nozzle 5. The cross-sectional area of the flow path through which gas flows (flow path cross-sectional area) at this time is given by $(ID2/2)^2 \times \Pi$. Therefore, the flow rate of the suction nozzle device 1 has the maximum value, and a large and heavy workpiece can be sucked.

Figure 6B:
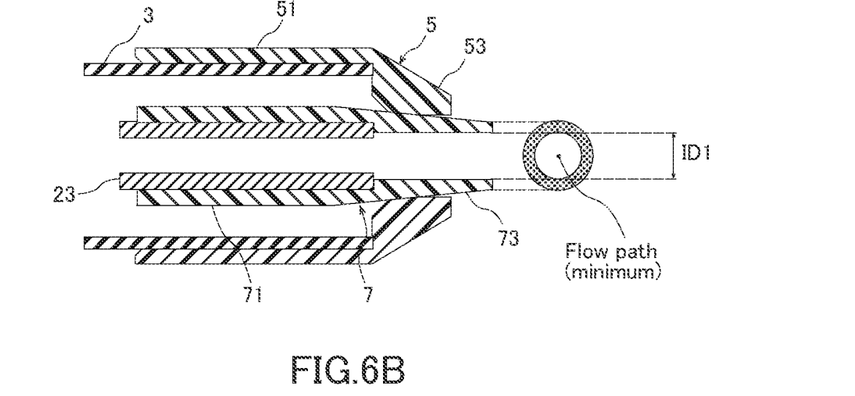
FIG. 6B is a longitudinal cross-sectional view showing the flow path cross-sectional area corresponding to the second state shown in FIG. 5B.

As shown in FIGS. 5B and 6B, when the small-diameter pipe 23 is moved forward relative to the large-diameter pipe 3 until the outer peripheral surface of the tip portion 73 of the small-diameter nozzle 7 is brought into close contact with the rear inner edge 57 of the tip portion 53 of the large-diameter nozzle 5, the small-diameter nozzle 7 protrudes from the large-diameter nozzle 5. Since the outer diameter OD1 of the small-diameter nozzle 7 is smaller than the outer diameter OD2 of the large-diameter nozzle 5, the small-diameter nozzle 7 is suitable for sucking a relatively small workpiece. At this time, the gap space 29 between the large-diameter pipe 3 and the small-diameter pipe 23 is closed; therefore, the flow path diameter of the suction nozzle device 1 matches the inner diameter of the small-diameter nozzle 7. The flow path cross-sectional area is given by $(ID1/2)^2 \times \Pi$. The flow rate of the suction nozzle device 1 has the minimum value, and a small and light workpiece can be sucked suitably.

Figure 6C:
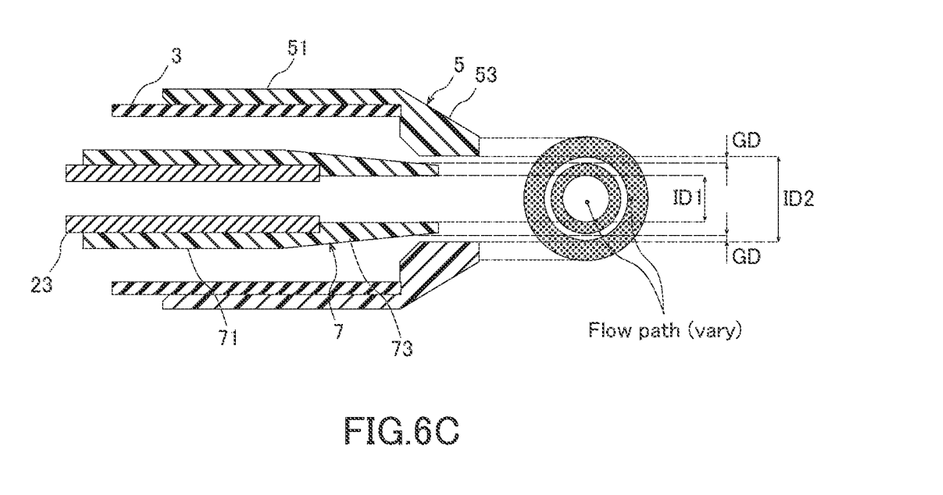
FIG. 6C is a longitudinal cross-sectional view showing the flow path cross-sectional area corresponding to the third state shown in FIG. 5C.

As shown in FIGS. 5C and 6C, the small-diameter pipe 23 is moved so as to stop at a given position between a position where the outer peripheral surface of the tip portion 73 of the small-diameter nozzle 7 is separated from the rear inner edge 57 of the tip portion 53 of the large-diameter nozzle 5 by the maximum distance of the movable range (FIG. 6A) and a position where the outer peripheral surface of the tip portion 73 of the small-diameter nozzle 7 is in close contact with the rear inner edge 57 of the tip portion 53 of the large-diameter nozzle 5 (FIG. 6B). At this time, the tip portion 73 of the small-diameter nozzle 7 partially overlaps the tip portion 53 of the large-diameter nozzle 5, and gas is in a circular region defined by the inner peripheral surface of the small-diameter nozzle 7 and an annular region defined by the inner peripheral surface of the tip portion 53 of the large-diameter nozzle 5 and the outer peripheral surface of the tip portion 73 of the small-diameter nozzle 7.

The distance GD between the outer peripheral surface of the tip portion 73 of the small-diameter nozzle 7 and the rear inner edge 57 of the tip portion 53 of the large-diameter nozzle 5 changes continuously in accordance with the positional relationship between the two, that is, in accordance with the movement of the small-diameter pipe 23, since the tip portion 73 of the small-diameter nozzle 7 has a truncated cone shape. When the small-diameter pipe 23 moves forward from the most drawn position, the outer peripheral surface of the tip portion 73 of the small-diameter nozzle 7 gradually approaches the rear inner edge 57 of the tip portion 53 of the large-diameter nozzle 5, and the distance GD gradually becomes shorter. Correspondingly, the flow path cross-sectional area "(ID2/2)²×Π" of the large-diameter nozzle 5 is narrowed, and the flow rate is also reduced. That is, as the small-diameter pipe 23 moves, the gap GD between the outer peripheral surface of the tip portion 73 of the small-diameter nozzle 7 and the rear inner edge 57 of the tip portion 53 of the large-diameter nozzle 5 changes continuously; accordingly, the flow path cross-sectional area changes continuously between the maximum flow path cross-sectional area "(ID2/2)²×Π" and the minimum flow path cross-sectional area "(ID1/2)²×Π", and the flow rate also changes continuously. By moving the small-diameter pipe 23 and stopping it at an appropriate position, the flow rate can be adjusted in accordance with the weight of the workpiece and the suction force can be optimized.

Figure 6D:
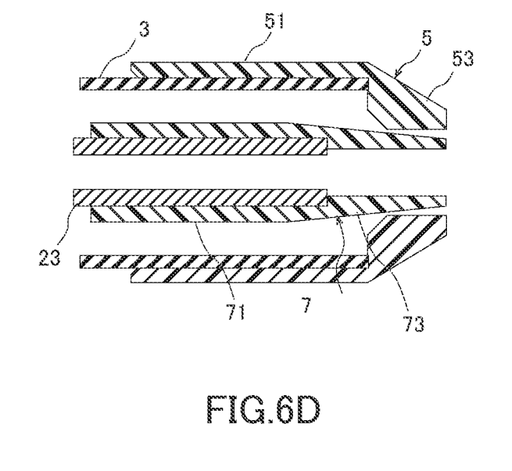
FIG. 6D is a longitudinal cross-sectional view showing the flow path cross-sectional area corresponding to the third state in a modification of the suction nozzle device shown in FIG. 1.

By aligning the tip of the small-diameter nozzle 7 with the tip of the large-diameter nozzle 5 as shown in FIG. 6D, the contact area of the nozzle with the workpiece can be maximized.

As described above, according to the present embodiment, by changing the relative positions of the large-diameter pipe and the small-diameter pipe and delicately moving the small-diameter nozzle in and out of the large-diameter nozzle, the contact area of the nozzle with the workpiece can be switched between two or three levels, and the flow path cross-sectional area (flow rate) can be continuously adjusted between the maximum flow path cross-sectional area corresponding to the diameter of the large-diameter nozzle and the minimum flow path cross-sectional area corresponding to the diameter of the small-diameter nozzle, whereby the workpiece can be stably sucked.

In addition, the introduction of a simple structure for changing the relative positions of the large-diameter pipe and the small-diameter pipe makes it possible to reduce the size and weight of the suction nozzle device, thereby reducing weight and inertia, and realize a faster suction and conveyance operation than in the conventional technique.

Further, the selection of the large-diameter nozzle or the small-diameter nozzle is achieved by the relative movement between the large-diameter pipe and the small-diameter pipe. Since there is no need to provide a moving mechanism directly on a nozzle changing mechanism or a nozzle as in the conventional technique, the nozzle portion can be reduced in size. In addition, since the large-diameter nozzle and the small-diameter nozzle are attached to the tips of the large-diameter pipe and the small-diameter pipe, the nozzles can be inserted into a narrow space.

In the above description, the suction nozzle device has been described as a double-pipe structure of pipes and nozzles, but may be a multi-pipe structure of more pipes and nozzles. In other words, the suction nozzle device may include a plurality of pipes having different diameters which are inserted sequentially, a plurality of nozzles having different diameters which are respectively attached to the tips of the pipes, and a support mechanism for supporting the pipes so as to be movable relative to each other. The basic structures such as the support mechanism are the same as described above. In this multi-pipe structure, one of the nozzles selectively protrudes as the pipes move relative to each other, and the flow path cross-sectional area is set to the inner diameter cross-sectional area of the protruding one of the nozzles.

While some embodiments of the present invention have been described, these embodiments have been presented as examples, and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. A suction nozzle device for vacuum-sucking a workpiece, comprising:
   a large-diameter pipe;
   a large-diameter nozzle attached to a tip of the large-diameter pipe;
   a small-diameter pipe coaxially inserted into the large-diameter pipe and having an outer diameter shorter than an inner diameter of the large-diameter pipe in order to provide a gap between the small-diameter pipe and the large-diameter pipe;
   a small-diameter nozzle attached to a tip of the small-diameter pipe; and
   a support mechanism for supporting the large diameter pipe and the small diameter pipe so as to be movable relative to each other, wherein
   as the large-diameter pipe and the small-diameter pipe move relative to each other, the suction nozzle device changes between a state where the small-diameter nozzle protrudes from the large-diameter nozzle and a state where the small-diameter nozzle is drawn into the large-diameter nozzle, and changes between a state where a flow path cross-sectional area of a flow path through which gas flows is set to an inner cross-sectional area of the small-diameter pipe by an outer peripheral surface of the small-diameter nozzle being brought into close contact with a rear inner edge of the large-diameter nozzle so as to close a gap between the large-diameter pipe and the small-diameter pipe, a state where the flow path cross-sectional area is set to an inner diameter cross-sectional area of the large-diameter nozzle by the outer peripheral surface of the small-diameter nozzle being separated from the rear inner edge of the large-diameter nozzle so as to open the gap between the large-diameter pipe and the small-diameter pipe, and a state where the flow path cross-sectional area is set to a value within an area range less than the inner diameter cross-sectional area of the large-diameter nozzle but greater than the inner diameter cross-sectional area of the small-diameter nozzle by the outer peripheral surface of the small-diameter nozzle approaching the rear inner edge of the large-diameter nozzle.

2. The suction nozzle device according to claim 1, wherein the small-diameter nozzle has a truncated cone shape with a tip having an outer diameter shorter than an inner diameter of the large-diameter nozzle and a rear end having an outer diameter longer than the inner diameter of the large-diameter nozzle.

3. The suction nozzle device according to claim 2, wherein a length of a portion of the small-diameter nozzle from a position where an outer diameter thereof matches the inner diameter of the large-diameter nozzle to a tip thereof is longer than a length of the large-diameter nozzle.

4. The suction nozzle device according to claim 1, further comprising:
   a connection block connected to a rear portion of the large-diameter pipe and forming an airtight chamber communicating with an inside of the large-diameter pipe, wherein the small-diameter pipe is provided with a communication hole for communicating an inside of the small-diameter pipe with the airtight chamber.

5. The suction nozzle device according to claim 1, wherein an entry prevention bracket for preventing the workpiece from entering is provided at the tip of the small-diameter pipe and inside the small-diameter nozzle.

6. A suction nozzle device for vacuum-sucking a workpiece, comprising:
   a large-diameter pipe;
   a large-diameter nozzle attached to a tip of the large-diameter pipe;
   a small-diameter pipe inserted into the large-diameter pipe and having an outer diameter shorter than an inner diameter of the large-diameter pipe in order to provide a gap between the small-diameter pipe and the large-diameter pipe;
   a small-diameter nozzle attached to a tip of the small-diameter pipe; and
   a support mechanism for supporting the large diameter pipe and the small diameter pipe so as to be movable relative to each other, wherein
   as the large-diameter pipe and the small-diameter pipe move relative to each other, a flow path cross-sectional area of a flow path through which gas flows changes continuously between an inner diameter cross-sectional area of the small-diameter nozzle and an inner diameter cross-sectional area of the large-diameter nozzle.

7. A suction nozzle device for sucking a workpiece, comprising:
   a plurality of pipes having different diameters and configured to be sequentially inserted;
   a plurality of nozzles having different diameters and respectively attached to tips of the pipes; and
   a support mechanism for supporting the pipes so as to be movable relative to each other, wherein
   as the pipes move relative to each other, one of the nozzles selectively protrudes, and a flow path cross-sectional area is set to an inner diameter cross-sectional area of the protruding one of the nozzles.

* * * * *